(12) United States Patent
Gaither et al.

(10) Patent No.: US 8,051,250 B2
(45) Date of Patent: Nov. 1, 2011

(54) SYSTEMS AND METHODS FOR PUSHING DATA

(75) Inventors: Blaine D Gaither, Fort Collins, CO (US); Darel N. Emmot, Fort Collins, CO (US); Judson E. Veazey, Fort Collins, CO (US); Benjamin D. Osecky, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 463 days.

(21) Appl. No.: 11/686,132

(22) Filed: Mar. 14, 2007

(65) Prior Publication Data

US 2008/0229009 A1    Sep. 18, 2008

(51) Int. Cl.
*G06F 12/00* (2006.01)

(52) U.S. Cl. ......... 711/141; 711/137; 711/150; 711/157

(58) Field of Classification Search ................. 711/113, 711/141, 137, 144, 213, 150, 157; 712/23; 709/214
See application file for complete search history.

(56) References Cited

U.S. PATENT DOCUMENTS

| | | | |
|---|---|---|---|
| 5,261,069 A * | 11/1993 | Wilkinson et al. | 711/145 |
| 6,704,842 B1 * | 3/2004 | Janakiraman et al. | 711/141 |
| 6,711,651 B1 * | 3/2004 | Moreno et al. | 711/141 |
| 6,775,748 B2 * | 8/2004 | Jamil et al. | 711/146 |
| 6,839,816 B2 | 1/2005 | Borkenhagen et al. | |
| 7,133,972 B2 | 11/2006 | Jeddeloh | |
| 7,167,954 B2 | 1/2007 | So et al. | |
| 2003/0014593 A1 * | 1/2003 | Arimilli et al. | 711/122 |
| 2003/0163642 A1 * | 8/2003 | Borkenhagen et al. | 711/121 |
| 2005/0132139 A1 * | 6/2005 | Agaram et al. | 711/128 |
| 2005/0268039 A1 | 12/2005 | Archambault et al. | |

OTHER PUBLICATIONS

"Data Forwarding in Scalable Shared Memory Multiprocessors", Koufaty et al, IEEE Transactions on Parallel and Distributed Systems, vol. 7, No. 12, Dec. 1996, pp. 1250-1264.*
"Compiler Support for Data Forwarding in Scalable Shared-Memory Multiprocessors", Koufaty et al, IEEE Transactions on Parallel Processing, Sep. 21-24, 1999, pp. 181-190.*
Brorsson, M., Stenstrom, P., "Modelling accesses to migratory and producer-consumer characteriseddata in a shared memory multiprocessor", Parallel and Distributed Processing, 1994. Proceedings. Sixth IEEE Symposium on, Oct. 26-29, 1994, pp. 612-619.*
Gregory T. Byrd, Michael J. Flynn, "Producer-Consumer communication in distributed Shared Memory Multiprocessor", Proceedings of the IEEE, Mar. 1999, vol. 87, Issue: 3, On pp. 456-466.*
Abdel-Shafi, H., Hall, J., Adve, S.V., Adve, V.S., "An evaluation of fine-grain producer-initiated communication incache-coherent multiprocessors", High-Performance Computer Architecture, 1997., Third International Symposium on, Publication Date: Feb. 1-5, 1997, On pp. 204-215.*
Gregory T. Byrd, Michael J. Flynn, "Producer-Consumer communication in Distributed Shared Memory Multiprocessors", Jun. 15, 1998, Office of Naval Research.*

\* cited by examiner

*Primary Examiner* — Kevin Ellis
*Assistant Examiner* — Matthew Bradley

(57) ABSTRACT

A system for pushing data, the system includes a source node that stores a coherent copy of a block of data. The system also includes a push engine configured to determine a next consumer of the block of data. The determination being made in the absence of the push engine detecting a request for the block of data from the next consumer. The push engine causes the source node to push the block of data to a memory associated with the next consumer to reduce latency of the next consumer accessing the block of data.

26 Claims, 7 Drawing Sheets

SYSTEMS AND METHODS FOR PUSHING DATA

BACKGROUND

Modern computing environments generally provide for multiple sets of computer instructions to execute concurrently. For example, a computing environment may permit a single program to spawn two or more "threads," where the treads execute in parallel, or tow processes may execute concurrently on two different processors. When the instructions execute concurrently, it is frequently the case that these different sets of instructions may require shared access to particular data, such as a cache line. For example, two processors executing two different threads of a program may both need to read from, and write to, a data structure located within the systems main memory or on one or more processors' cache. Concurrency control policies thus can be implemented as one way to enforce limits on access to a resource, such as where there are many threads of execution. For instance, a lock is one way of enforcing a concurrency control policies that prevents other threads running on other processors from accessing a resource. Locks and other concurrency control mechanisms may result in increased latency for access to resources.

DETAILED DESCRIPTION

Figure 1:
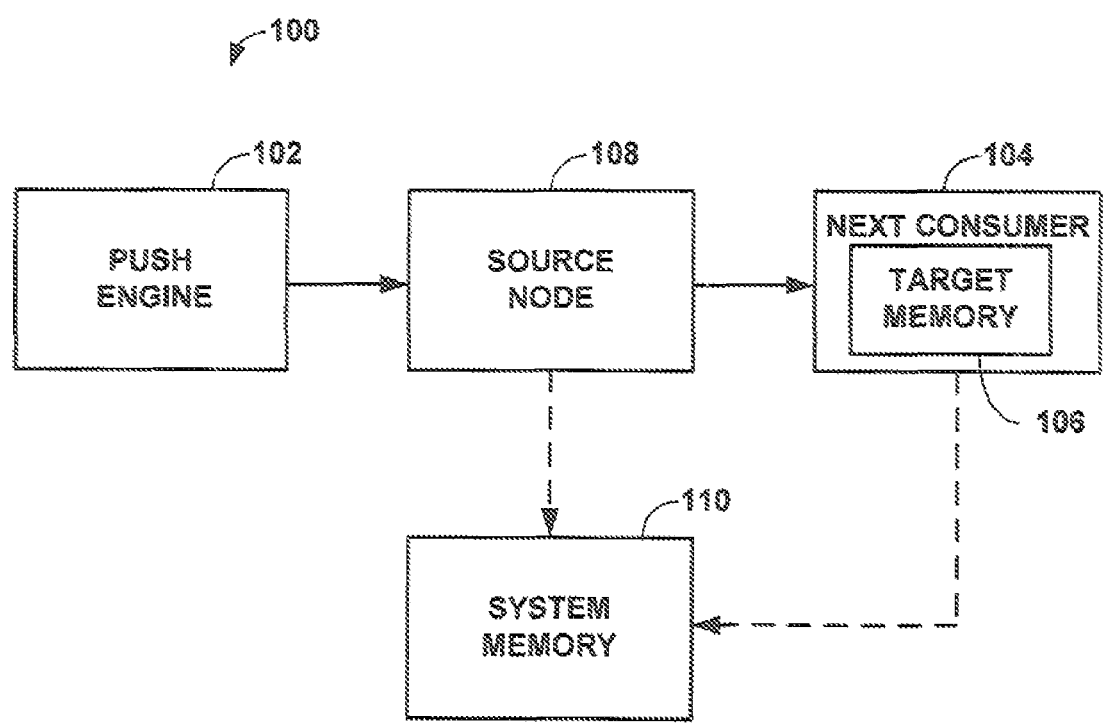
FIG. 1 depicts an embodiment of a system for pushing data.

FIG. 1 depicts an example of a system 100 for pushing data. The system 100 includes a push engine 102. The push engine 102 could be implemented, for example, as a processor, or a process running on a processor with instructions for performing certain operations. Alternatively, the push engine 102 could be implemented as operation code (e.g., "opcode"). The push engine 102 determines a next consumer 104 of a block of data. The next consumer 104 could be implemented, for example, as a processor, a controller, such as an input/output (I/O) controller or an I/O device (e.g., a graphics processing unit (GPU), or an Ethernet controller). There may be more than one next consumer of the block data. As used herein, the term "next" as applied to a data consumer, is not intended to require a particular order. That is, the next consumer 104 of the block of data need not be the immediately succeeding consumer of the block of data, but rather an expected consumer of the block data that may execute an instruction that employs the block of data sometime in the future. The block of data could be implemented as data in at least one cache line ("block of data"), although the block of data can correspond to any unit of data that can be pushed according to system requirements.

The push engine 102 can determine the next consumer 104 in the absence of detecting a request from the next consumer 104 for the block of data. The block of data can be pushed to the next consumer 104, for example, when one or more instructions being executed in the system 100 cause the block of data to become temporarily inaccessible to the next consumer 104. For instance, a concurrency control mechanism can be implemented to prevent concurrent access to resources, such as the block of data. The concurrency control mechanism can be employed at the source node, for example, as a lock mechanism (e.g., seqlock instructions) to prevent, temporarily, concurrent access to the block of data. Pushing the block of data to the next consumer 104 can reduce latency by decreasing the access time of the block of data for next consumer 104. One skilled in the art will appreciate other processes and/or situations where pushing data can be beneficial. As used herein, the term "push" and variations thereof are intended to encompass any transfer of a block of data to one or more potential consumer nodes that occurs in the absence of detecting a request (e.g., a read request, write request, etc.) from the potential consumer for such block of data. That is, a request for the block of data may be issued, but such request does not directly cause the source node 108 to push the data.

The push engine 102 can provide means for determining the next consumer 104 of the block of data in the absence of detecting a request for the block of data from the next consumer 104. The particular way that the push engine 102 determines the next consumer 104 could be based on the particular needs of the system 100 being implemented. For example, the push engine 102 could determine the next consumer 104 based on an examination of an instruction in an instruction queue or based on information contained in a process table employed by the operating system. Similarly, a queue of processes waiting for a lock may be inspected, or historical usage information may be used to determine if and when to push data. One skilled in the art will appreciate the alternate structure and methodologies for implementing the push engine 102.

The push engine 102 causes the block of data to be pushed to target memory 106 that is associated with the next consumer 104. The target memory 106 could be implemented for example, as one or more structures accessible at least by the next consumer 104, such as a local cache, a shared cache or local memory bank. In FIG. 1, the target memory 106 is illustrated as being internal to the next consumer 104, but it will be appreciated by those skilled in the art that the target memory 106 could be external to the next consumer 104 (e.g., an external cache). Additionally, it is to be understood that the target memory 106 could be implemented as a memory structure that is accessible by multiple processors, such as a shared cache memory. For purposes of simplification of explanation in this example, it will be understood that the next consumer 104 includes the target memory 106.

Additionally, the push engine 102 can identify a source node 108 that stores a coherent copy of the block of data that is to be pushed. The source node 108 could be implemented, for example, as a processor having at least one associated cache, wherein the at least one associated cache stores the coherent copy of the block of data. Those skilled in the art will understand and appreciate various means that can be employed to identify the source node 108, which means may vary according to the protocol being implemented in the system 100. For example, the push engine 102 could access a directory, such as a coherency directory, to identify the source node 108 if a directory based coherency protocol is employed by the system 100. In yet another example, the push engine 102 could identify the source node 108 by snooping a set of one or more processor nodes, including the source node 108. Additionally or alternatively, the push engine 102 could make the determination of the next consumer 104 based on an examination of an operating system (OS) process table.

When the next consumer 104 has been identified, the push engine 102 can operate as means for causing a coherent copy of the block of data to be pushed from the source node 108 to the target memory 106 associated with the next consumer 104. The push engine can cause the block of data to be pushed to target memory that resides in closer proximity to the next consumer than the memory at the source node from which the data is pushed. As a result, latency can be reduced when the next consumer accesses the block of data.

The push engine 102 can also cause the source node 108 to provided the block of data to a particular memory location, such as to a particular cache level of the next consumer 104. In this regard, push engine 102 can further provide means for determining which level of cache associated with the next consumer 104 the block of data is to be pushed. The level of cache can indicate proximity of the cache relative to the next consumer 104. Additionally or alternatively, the push engine 102 could specify a maximum cache level (e.g., a cache level at a maximum proximity) to which the block of data is to be pushed, which maximum cache level could be a cache level lower than the cache level of a coherency directory in a system that employs a coherency based protocol. Alternatively, the determination as to the level of cache to which block of data is pushed could be made by the source node 108 and/or the next consumer 104.

In certain circumstances, the block of data being pushed may be written back to system memory 110. The system memory 110 could be implemented, for example, as random access memory (RAM), such as static RAM or dynamic RAM. The source node 108 and/or the next consumer 104 can provide means for updating the system memory 110 after ownership of the block of data has been transferred to the target memory 106. For instance, the source node 108 can writeback the block of data to the system memory 110 depending on the coherency state associated with the block of data. As a further example, if the system 100 employs a directory based cache coherency protocol such as the MESI coherency protocol, the block of data could have an associated state of 'M' or 'E' that could indicate that the block of data is exclusively owned (and modified or unmodified) by the source node 108. It is to be understood that other coherency protocols could be employed. It is to be understood that the particular coherency state of the block of data and state transitions at the source node 108 and the next consumer 104 can vary based on the coherency protocol implemented.

When the next consumer 104 executes the examined instruction (e.g., the instruction that employs the block of data), typically, the next consumer 104 can attempt to read the block of data from a local cache, such as L1, L2, and L3 caches associated with the next consumer 104. Since the block of data has been pushed from the source node 108 to the target memory 106 that is accessible by the next consumer 104, next consumer 104 can receive a cache hit for the block of data. Since the next consumer 104 receives a hit for the block of data, the next consumer 104 can execute the examined instruction that employs the block of data with reduced latency compared to a situation when the next consumer would have received the data from the source node 108 (or from the system memory 110) in response to a request for such data.

Figure 2:
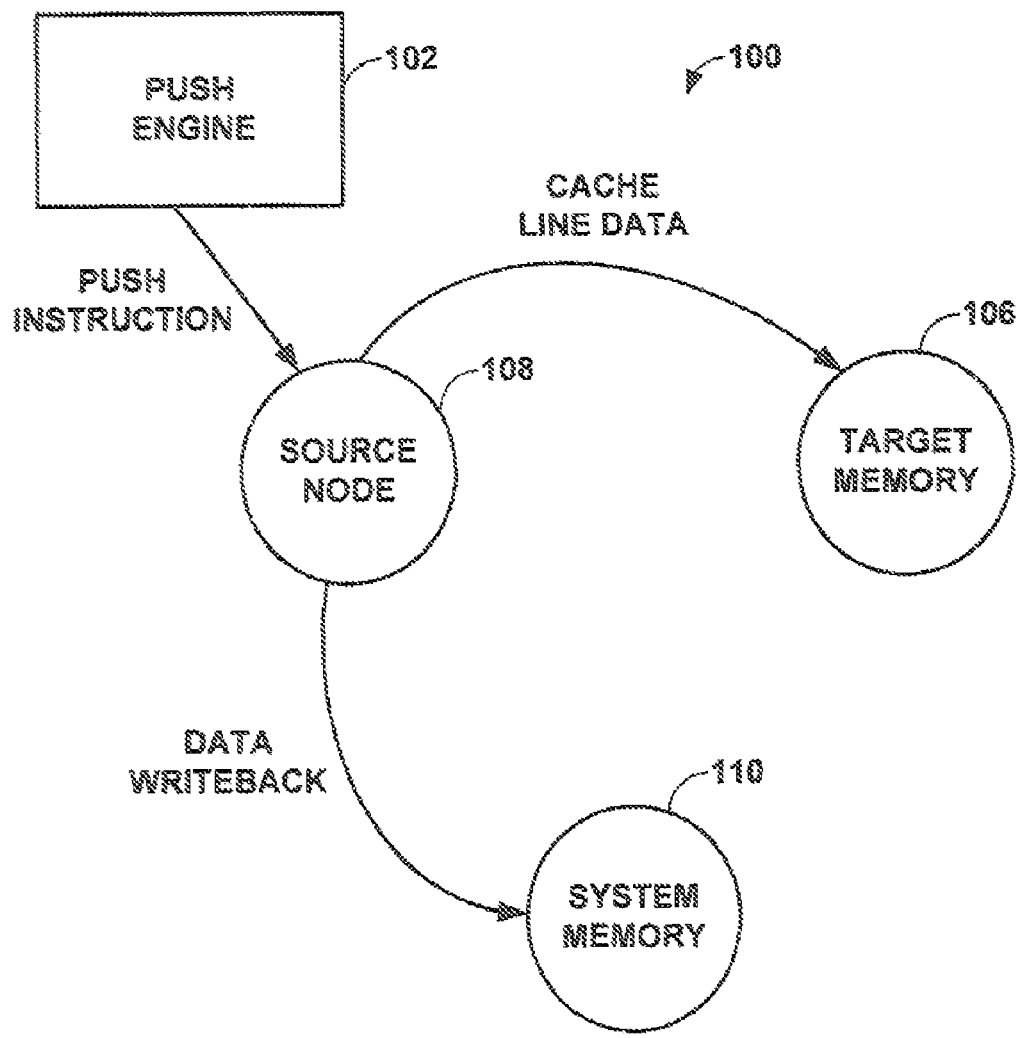
FIG. 2 depicts an embodiment of data flow diagram demonstrating an example of pushing data.

FIG. 2 illustrates an example of a data flow diagram, such as may correspond to the system 100 illustrated in FIG. 1. For purposes of simplification of explanation, the same reference numbers that are used in FIG. 1 are used in FIG. 2 to identify corresponding parts. In FIG. 2, the block of data has an associated cache coherency state that indicates that the cache line is exclusively owned and unmodified ('E' state) or modified ('M' state) by the source node 108. The push engine 102 provides the source node 108 with a push instruction that causes the source node 108 to push the block of data to the target memory 106. Additionally, the source node 108 can transfer ownership of the block of data to the target memory 106 and change the coherency state of the block of data at the source node 108 from exclusive and unmodified state ('E' state) or modified state ('M' state) to an invalid state ('I' state) after the block of data has been pushed to the target memory 106. In connection with the source node 108 pushing the block of data to the target memory 106, the source node 108 can perform a data writeback to the system memory 110. The data writeback can ensure that the system memory 110 receives and maintains a coherent copy of the block of data in conjunction with ownership of the block of data being transferred to the target memory 106.

Alternatively, the source node 108 can change the block of data from an exclusive unmodified state ('E' state) to a shared state ('S' state). In such a situation, the block of data could be changed to the shared state ('S' state) and the source node 108 could process the push instruction in a manner described above with respect to FIG. 1. Particular state changes may vary according to the cache coherency protocol being implemented. One of ordinary skill in the art will appreciate the various state changes that could be implemented.

Figure 3:
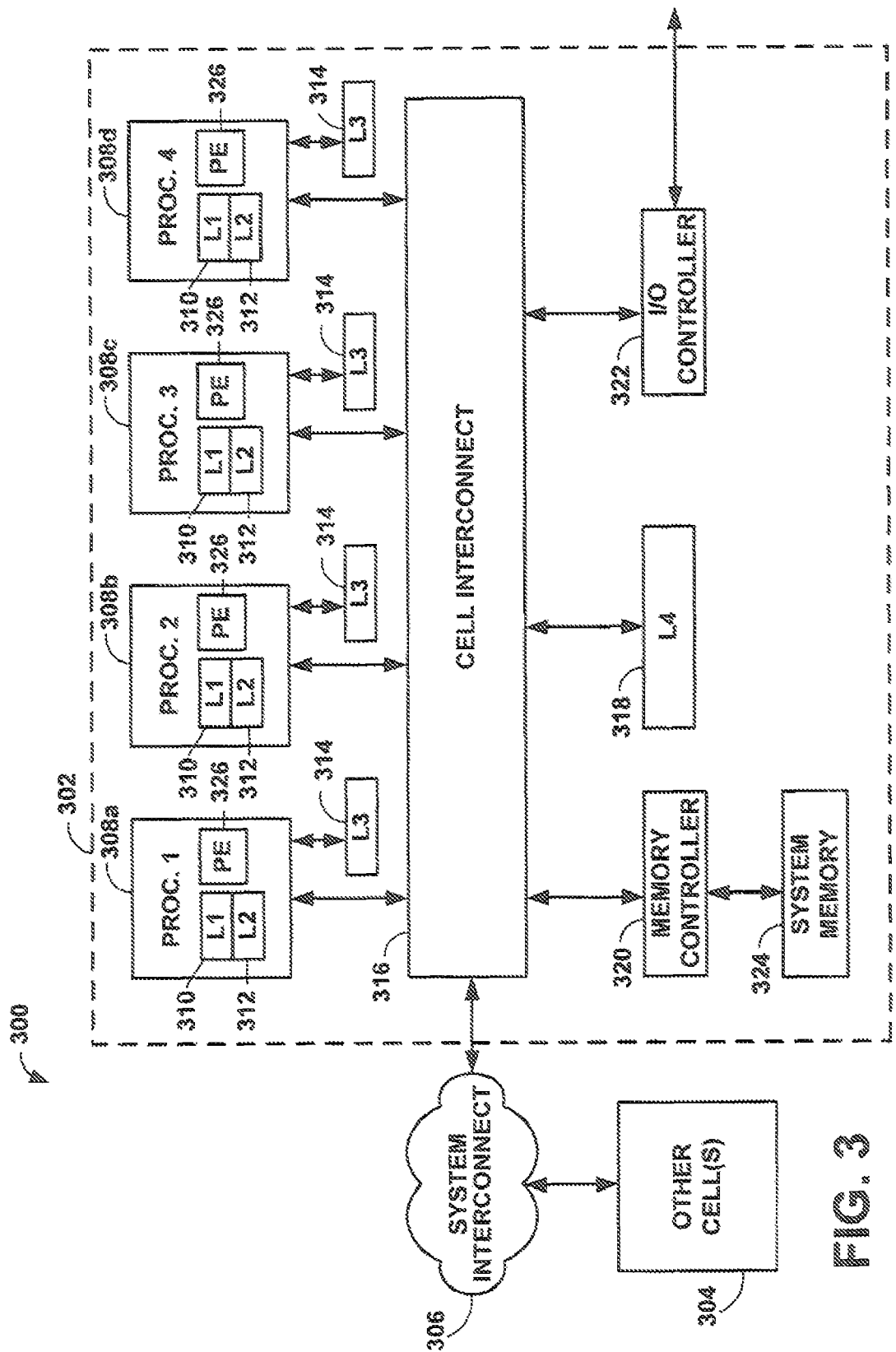
FIG. 3 depicts an embodiment of a multiprocessor system that can implement pushing data from a processor's cache.

FIG. 3 illustrates an example of a multiprocessor system 300 that can implement pushing data from a processor's cache to one or more next consumer. The system 300 includes a plurality of cells 302 and 304 that are communicatively coupled to each other via a system interconnect 306. The system interconnect 306 could be implemented, for example, one or more wires and/or switches that provide for electrical communication between the cells 302 and 304. For purposes of simplification of explanation, only cell 302 is shown in detail, but it is to be understood that other cells (e.g., cell(s) 304) could be implemented in a similar fashion. Alternatively, the other cell(s) 304 could be implemented in a different manner from the cell 302.

The cell 302 can include a plurality of processor cores indicated at PROC. 1-PROC.4 (308). Although the cell 302 is shown to have four processor cores 308, it is to be understood that the cell 302 could include one or more processor cores 308. The processors cores 308 could be implemented, for example as microprocessor cores that execute computer instructions. Each processor core 308 can include a cache hierarchy of two or more levels of cache. In the example illustrated in FIG. 3, each processor core 308 includes three hierarchical levels of local cache, namely L1 cache 310, L2 cache 312 and L3 cache 314, respectively. Each hierarchical level of cache indicates a relative proximity (or distance) of the cache to the respective cache's associated processor core 308. In the present example, the L1 cache 310 and L2 cache 312 are shown to be internal to the processor cores 308. Additionally, in the present example, the L3 cache 314 is shown to be an external cache, but it is to be understood that the L3 cache 314 could be internal as well. Furthermore, although three levels of cache are shown, it is to be understood that each of the processors cores 308 could have greater or fewer levels of cache. However, one skilled in the art would appreciate that the L1 cache 310 and/or the L2 caches 312 could be external to the processor cores 308 as well.

The processors cores 308 can communicate with each other over a cell interconnect 316. The cell interconnect 316 could be implemented, for example, as one or more wires and/or switches (e.g., a processor bus or backplane) that provide for electrical communication between the processors to a L4 shared cache 318. The L4 shared cache 318 could be implemented, for example as static RAM or dynamic RAM that is accessible to the processor cores 308. The cell interconnect 316 can also communicatively couple the processors to a memory controller 320 and an I/O controller 322. The memory controller 320 processes data transfer to and from a system memory 324. The system memory 324 could be implemented as RAM, such as static RAM or dynamic RAM. The I/O controller can processes data transfers to and from external devices (not shown), such as a GPU, an Ether controller and non-volatile memory storage (e.g., a hard disk).

Each processor core 308 can include a push engine 326 running as a process on the associated processor core 308. The push engine 326 could not be implemented, for example, as opcode that is executed on one or more of the processors core 308. Although FIG. 3 depicts a push engine 326 running on each of the processor cores 308, it is to be understood that the push engine 326 could run on fewer than all of the processors cores 308 or otherwise be distributed in the system or implemented as separate hardware for each cell.

As one example, the push engine 326 can continually or selectively examine instructions in a queue to determine the next consumer of a block of data. The queue could be implemented, for example, as an instruction pipeline, a data queue, a linked list, or a register that stores computer executable instructions. The push engine 326 can determine the next consumer of a block of data associated with an instruction in the queue that has not yet been execute. The push engine and the examination of the instruction could implemented in conjunction with the execution of one or more instructions associated with a lock instruction structure. For example, the push engine can be implemented as opcode that is executed at or near the end of the lock instruction structure such as, for example, during an unlock (or lock freeing) operation. As is known lock instruction could, for example, prevent processors other than the processor executing the lock instruction from accessing the particular block of data.

Figure 4:
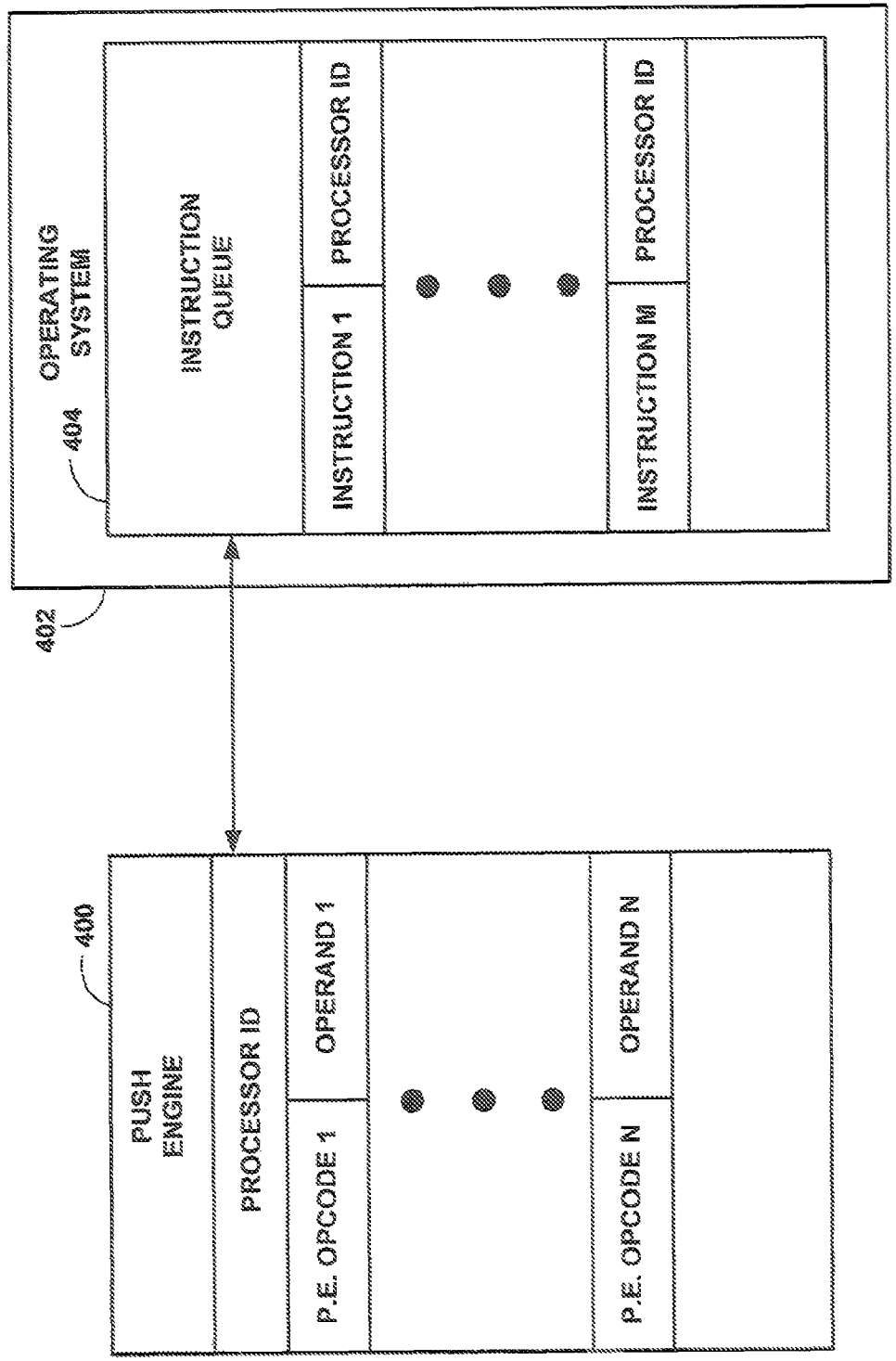
FIG. 4 depicts an embodiment a push engine.
Figure 5:
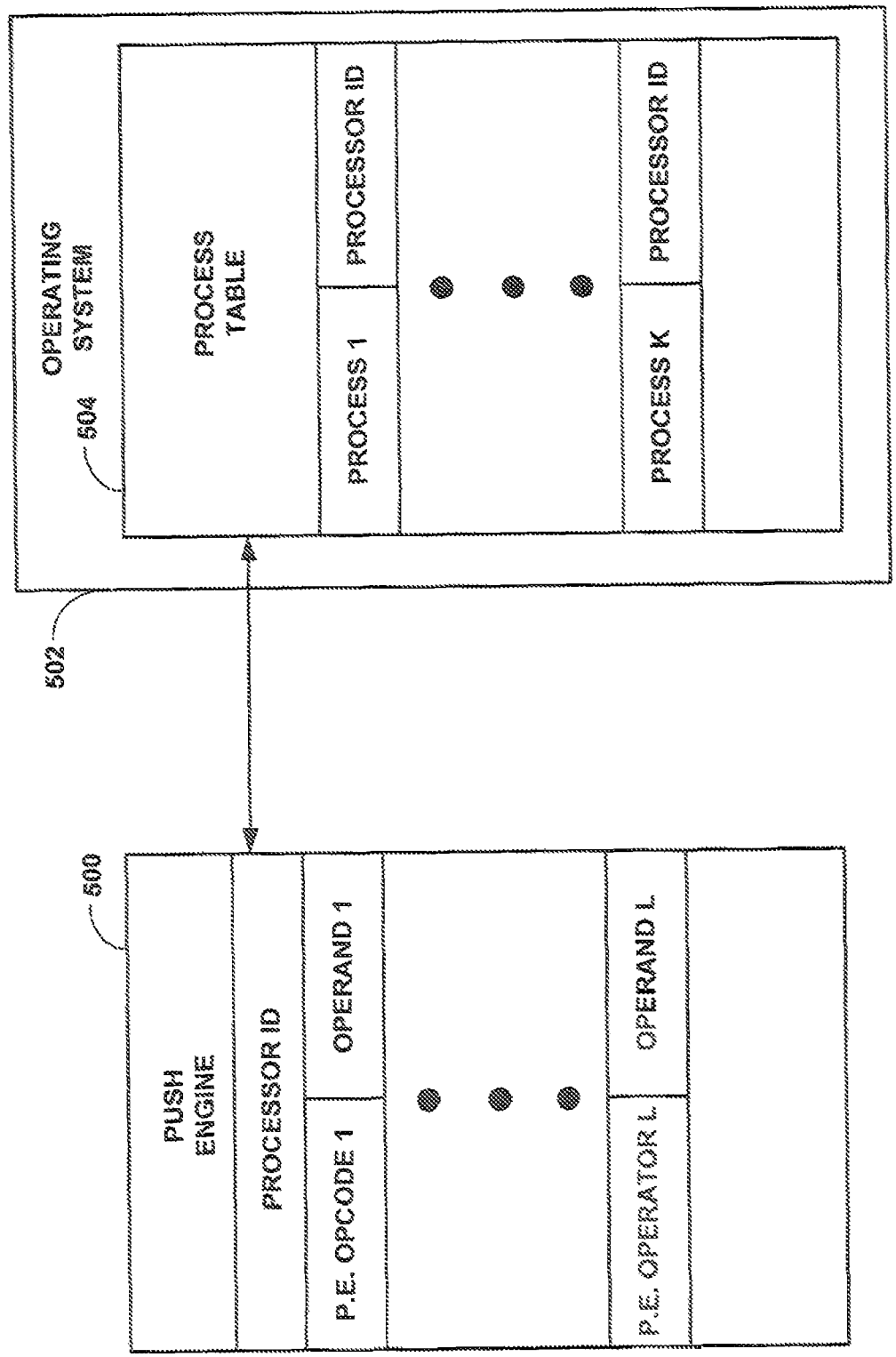
FIG. 5 depicts another embodiment of push engine.

The determination by the push engine 326 of the next consumer of the block of data could be implemented in a number of different ways, such as discussed with respect to FIGS. 4 and 5. Additionally, the push engine 326 can determine at least one target memory associated with the next consumer. The at least one target memory could be implemented, for example, as local or shared cache associated with the next consumer, such as in the case of the next consumer being implemented as a processor. As an example, if the next consumer is implemented as one of the processor cores 308, the at least one target memory could be implemented as one or more of the local caches (L1, L2 and L3) 310, 312 and 314 associated with the respective processor core 308. Additionally or alternatively, the at least one target memory could include the L4 shared cache 318 accessible by all of the processor cores 308. Additionally or alternatively, the at least one target memory could be a memory bank associated with the next consumer, such as in the case of the next consumer being implemented as an I/O controller or an I/O device.

Additionally, the push engine 326 (e.g., running as opcode) could identify a source node and cache level that stores a coherent copy of the block of data. The push engine 326, for example, can identify the source node by querying a coherency directory in the system 300, such as if a directory based coherency protocol is implemented. As yet another example, the source node could be identified via a snoop instruction, for example, if the system 300 implements a non-directory based cache coherency protocol. The source node could be implemented, for example, as one of the processors 308 and the processor's associated caches 310, 312, 314. For instance, the coherent copy of the block of data could be stored in one or more lines of cache of an associated cache of the source node.

After the source and at least one target memory for the block of data are ascertained by the push engine 326, the push engine 326 causes (e.g., by a push instruction) the source processor to push the coherent copy of the block data to the at least one target memory. The data can be provided as pushed data having a unique identifier that enable s the destination to receive and store the block of data in the target memory in the absence of issuing a request for the block of data.

In one example, the push engine 326 can provide information to the source node that indicates a particular cache level (e.g., L1, L2, or L3) associated with the next consumer to which the coherent copy of the block of data is to be pushed.

Additionally or alternatively, the push engine 326 could provide information to the source node that indicates a maximum cache level in the cache hierarchy to which the block of data is to be pushed (e.g., maximum proximity to the next consumer). The maximum cache level could be, for example, a cache level lower than a coherency directory, such as could be provided in a system that implements a directory based coherency protocol. Accordingly, the consumer receiving the pushed block of data can store the block of data in the maximum level or nay lower level of cache in the processor's cache hierarchy.

As a further example, the source node and/or the next consumer could determine the appropriate level of cache to which the block of data is pushed, for example, by examining the size (e.g., number of bytes) of the coherent copy of the block data. For instance, the L1 cache 310 could have a smaller storage space than the L3 cache 314, etc. If the block of data is sufficiently large, the block of data could exceed the maximum size of a particular cache level, and as such, the block of data could be written to a cache level that has sufficient size to store the block of data (e.g., a higher cache level).

If the source node determines that the coherent copy of the block of data is stored in the L4 shared cache 318, the source node or the push engine could be configured to ignore the push, since the next consumer could access the L4 shared cache 318 without requesting the block of data associated with the examined instruction form the source node. Alternatively, the source node could still push the block of data to a lower lever of cache in the cache hierarchy so that the data will end up in a cache level more proximate to the next consumer.

Ownership of the coherent copy of the data may be transferred to the consumer to which the block of data is pushed (see, e.g., FIG. 2). Alternatively, the source node could change the one or more cache lines that store the coherent copy of the block data from the 'E' state the 'M' state to a shared state ('S' state), which indicates that more than one cache stores a coherent copy of the block of data. It is to be understood that the particular coherency states of the block of data can vary based on the coherency protocol being implemented. One skilled in the art will appreciate the multiple of possible implementations for transferring ownership of the block of data.

In conjunction with the source node pushing the coherent copy of the block of data to the at least one target memory, the source node can perform a data writeback to the memory controller 320. The memory controller 320 can store the coherent copy of the data to the system memory 324. As an example, the writeback can be performed by the source node if the one or more cache lines that store the coherent copy of the data is/are in the 'E' state or 'M' state. The data writeback can ensure that the system memory 324 receives a copy of the block of data. Additionally or alternatively, the next consumer may also perform a data writeback of the coherent copy of the block of data to the memory controller 320. It is to be understood and appreciated that, although the present example utilizes coherency states of the MESI protocol, the particular coherency states can vary based on the coherency protocol implemented. One skilled in the art will appreciate the possible implementations of a writeback of the block of data.

When the next consumer executes instructions that employ the block of data (e.g., the examined instruction), typically, the next consumer can search local and shared memory structures (e.g., local and shared caches 310, 312, 314, 318) that are associated with such next consumer. Since the block of data has been pushed to a more local or shared memory structure(s), the next consumer can receive a "cache hit" for the pushed data. Thus, the next consumer can execute the instruction that employs the block of data without requesting the block of data from another node, thus reducing latency of the next consumer accessing the block of data. It is to be understood that the next consumer need not actually employ the block of data for the present system to be implemented. As an alternative example, the next consumer could evict the block of data from the at least one target memory, or simply never execute the examined instructions.

FIG. 4 illustrates an example approach for implementing a push engine 400. The push engine 400 could be executed on or more processor cores, such as shown and described with respect to FIGS. 1-3. The push engine 400 can interact with an operating system 402 executing on a system. It is to be understood that the operating system 402 could be executed on one or more of the processor cores. The operating system 402 can, for example, control operations of one or more of the cells (e.g., cells 302 and 304 illustrated in FIG. 3). The operating system 402 can include an instruction queue 404. The instruction queue 404 could be implemented as an instruction pipeline, a data queue, a linked list, a data register or other memory structure. The instruction queue 404 can include, for example, INSTRUCTION 1 through INSTRUCTION M, where each instruction can be implemented as a computer executable instruction, where M is an integer grater than or equal to one. In the present example, the instruction queue 404 stores instructions that have not yet been executed by one of the processor cores 308. In such an example, an instruction can be removed from the instruction queue 404 after the instruction has been executed by one of the processor cores 308.

Each of the M number of instructions can include an associated PROCESSOR ID, the PROCESSOR ID identifying a processor that is associated with the corresponding instruction. The PROCESSOR ID could be implemented, for example, as an argument of the corresponding instruction, or as a data field. In the present example, the PROCESSOR ID can indicate the particular processor that will execute the instruction, however one skilled in the art will appreciate that other implementations of the instruction queue 404 are possible.

The push engine 400 can include a PROCESSOR ID that identifies the particular processor that executes the one or more instructions associated with the push engine 400. As an example, the push engine 400 includes N line of push engine instructions, where N is an integer greater than or equal to one. Each instruction could include, for example, an opcode (e.g., and operator) indicated at P.E. OPCODE 1 through P.E. OPCODE N and an associated operand, indicated at OPERAND 1 through OPERAND N. Each operand could identify, for example, a block of data on which the corresponding line of opcode operates.

As an example, the push engine 400 can be configured to query the instruction queue 404 to determine a PROCESSOR ID associated with a particular instruction. The particular implementation of the query can vary based on the implementation of the instruction queue. As one example, the push engine 400 can access and examine an instruction ("the examined instruction") and the associated PROCESSOR ID. The examined instruction could be, for example, a top most instruction of the instruction queue 404. From the PROCESSOR ID associated with the examined instruction, the push engine 400 can be configured to identify the next consumer of a block of data, which block of data could be an operand associated with the examined instruction. By way of example, the opcode associated with the push engine 400 can be implemented as one or more instructions, such as instructions for implementing a locking mechanism or other concurrency control mechanism. Thus, the push engine 400 can employ the information in the instruction queue 404 to determine the next consumer of the block of data.

FIG. 5 illustrates another approach for implementing a push engine 500. The push engine 500 could be executing on or more processor cores. The push engine 500 can interact with an operating system 502 executing on a system, such as could be executed on one or more of the processor cores. The operating system 502 can, for example, control operations of one or more of cells (e.g., cells 302 and 304 illustrated in FIG. 3). The operating system 502 can include a process table 504. The process table 504 could be implemented as an instruction pipeline, a data queue, a linked list, a data register or other data structure. The process table 504 can include, for example, PROCESS 1 through PROCESS K, where each process can be implemented as one or more computer instructions (e.g., a thread) executing on a processor, where K is an integer greater than or equal to one.

Each process (PROCESS 1-PROCESS K) can include an associated PROCESSOR ID, the PROCESS ID identifying a processor that is associated with the corresponding process. The processor could be the processor that currently executes computer instructions associated with the process. The PROCESSOR ID could be implemented, for example, as a data field or data flag. In the present example, the PROCESSOR ID can indicate the particular processor that is and/or will execute program instructions associated with the corresponding process.

The path engine 500 can include a PROCESSOR ID that identifies the particular processor that executes the one or more instructions associated with the push engine 500. As an example, the push engine 500 includes L lines of push engine instructions, where L is an integer greater than or equal to one. Each instruction could include, for example, an opcode (e.g., an operator) indicated at P.E. OPCODE 1 through P.E. OPCODE L and an associated operand, indicated at OPERAND 1 through OPERAND L. Each operand could identify, for example, data on which the corresponding line of opcode operates.

As an example, the P.E. OPCODE can be configured to query the process table 504 to determine a PROCESSOR ID of the next consumer of a block of data. The particular implementation of the query can vary based on the implementation of the process table 504. As one example, the push engine 500 (via the P.E. OPCODE) could provide the process table 504 with an identification of a block of data, and the process table 505 or associated hardware and/or software (not shown) could parse the process table 504 for an instruction that employs the identified block of data. The process table 504 could then identify the process that is associated with the instruction (e.g., one of PROCESS 1-PROCESS K). Accordingly, the process table 504 could provide the PROCESS ID associated with the process that is associated with the instruction that employs the identified block of data. From the PROCESSOR ID provided by the process table 504, the push engine 500 can be configured to identify the next consumer of the block of data. By way of example, opcode associated with the push engine 500 can be implemented as one or more instructions associated with one or more other instructions, such as a locking mechanism. Thusly, the push engine 500 can determine the next consumer of the block of data.

Figure 6:
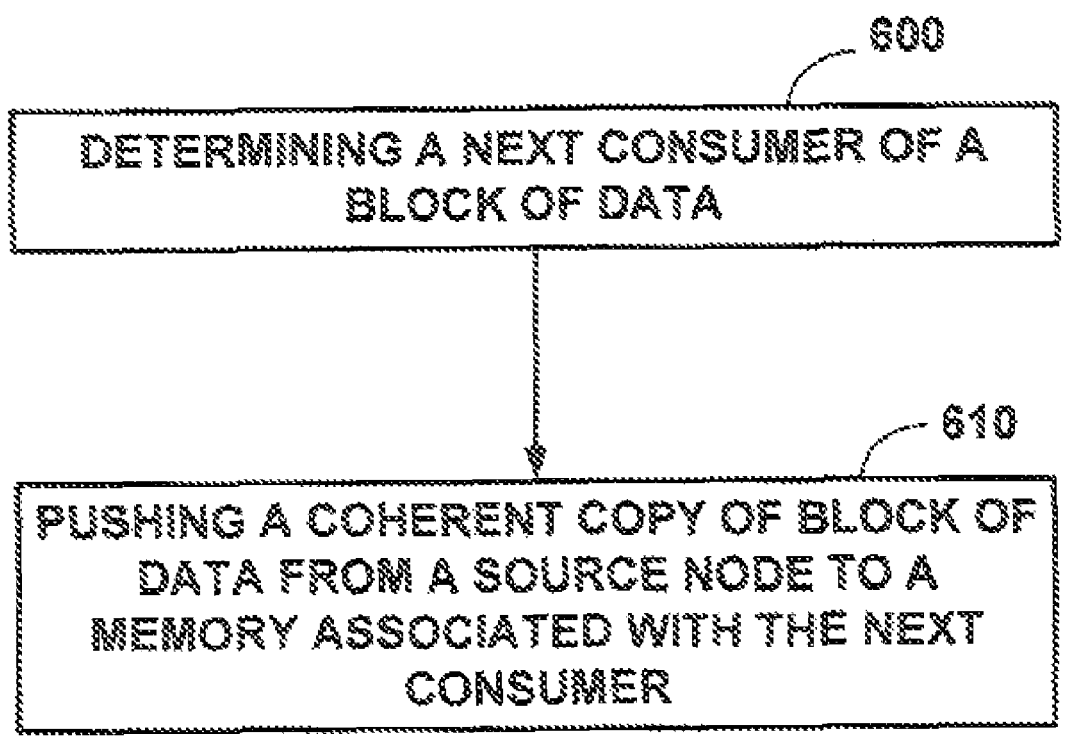
FIG. 6 depicts a flowchart of an embodiment of a process for pushing data.
Figure 7:
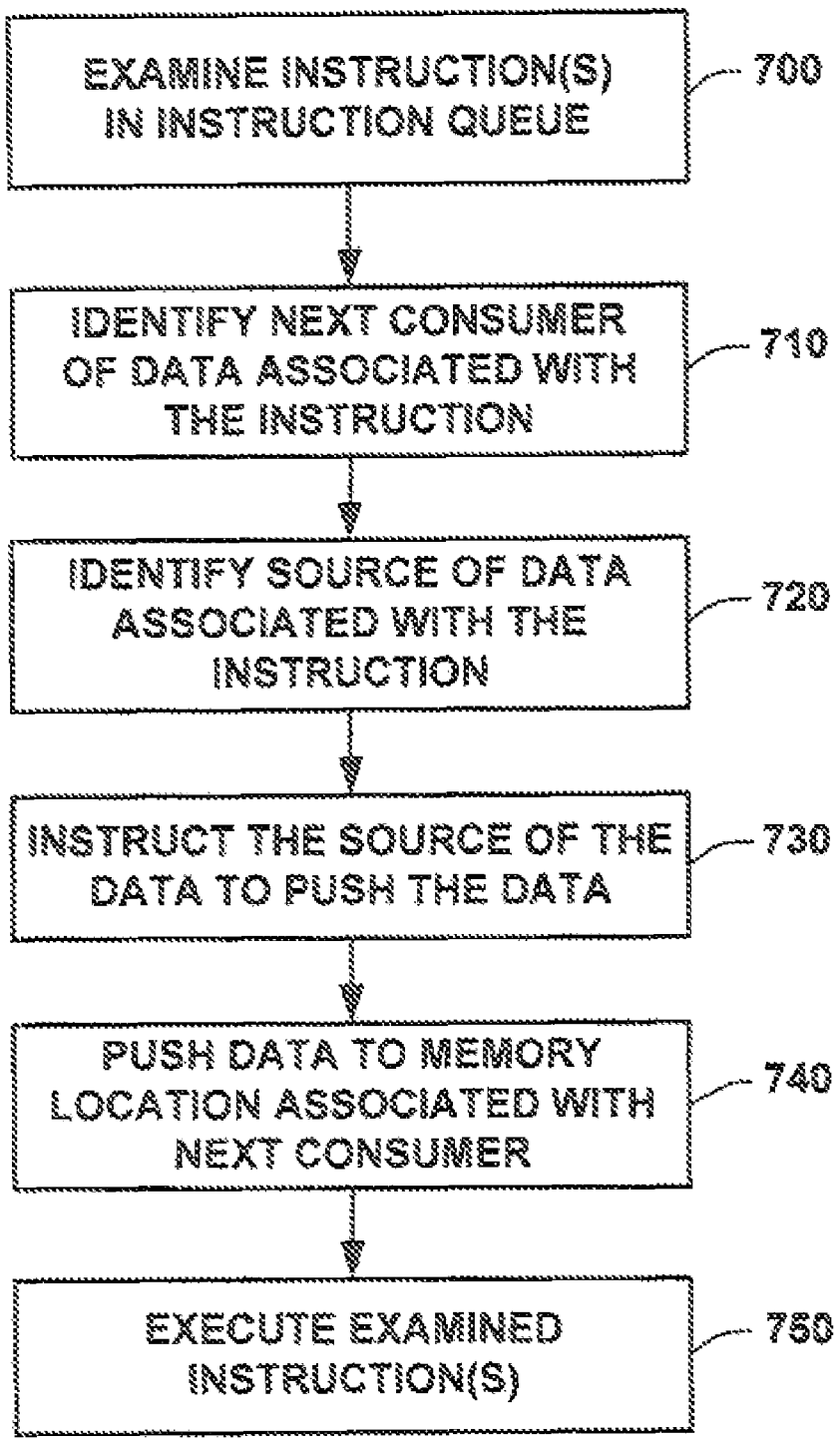
FIG. 7 depicts another flowchart of an embodiment of a process for pushing data.

FIGS. 6 and 7 illustrate examples of methods that can be employed to push data to next consumer. It is to be understood and appreciated that the illustrated actions, in other embodiments, may occur in different orders and/or concurrently with other actions. Moreover, not all illustrated features may be required to implement a process. The methods of FIGS. 6 and 7 could be implemented, for example, as a process (e.g., one or more lines of computer executable instructions, such as opcode) that is executed by a processor.

FIG. 6 illustrates a flow chart of a method. At 600, the method determined a next consumer of a block of data in the absence of detecting a request for the block of data from the next consumer. At 610, a coherent copy of the block of data is pushed from a source node to a memory associated with the next consumer to reduce latency of the next consumer accessing the block of data.

FIG. 7 illustrates a flowchart of another method for pushing data. At 700, a push engine examines in instruction ("the examined instruction"). The instruction could be examined, for example, during the execution of one or more instructions associated with a lock instruction structure. The examined instruction could be the next instruction to be executed in an instruction queue. The instruction queue could be implemented, for example, as a processor pipeline, a data queue, a linked list, a data register or other memory structure. The process proceeds to 710.

At 710, the push engine identifies a next consumer of data associated with the examined instruction. The data could be implemented, for example, as one or more cache lines of data. The next consumer could be, for example, a processor or I/O device that is associated with one or more memory banks, such a cache or a local memory bank. The next consumer could be identified, for example, by the examined instruction, such as by an argument of the examined instruction. Alternatively, the next consumer could be identified by an OS process table that identifies processors and/or I/O devices that are associated with a particular thread, the examined instruction being associated with a thread. The process proceeds to 720. At 720, a source of the data associated with the examined instruction is identified. The source of the data could be a location of memory (e.g. a memory address) that stores a coherent copy of the data. As an example, the source of the data could be a local cache of a processor. The source of the data could be identified via snooping, or additionally or alternatively, the source of the data could be identified using a directory, such as a coherency directory in a system that employs a directory based coherency protocol, such as the MESI protocol.

At 730, the push engine instructs the source of the data to push the data to a memory location associated with the next consumer. The memory location could be implemented as a cache associated with the next consumer, for example, if the next consumer is implemented as a processor. Alternatively, the memory location could be implemented as a RAM (e.g., static RAM or dynamic RAM) associated with the next consumer if, for example, the next consumer is implemented as an I/O device, such as a GPU or non-volatile memory storage controller. Additionally, the push engine could be configured to also include information that identifies a particular level of proximity to which the data is to be pushed. For example, the push engine could specify a cache level to which the source of the data is to push the data, if the next consumer is implemented as a processor with an associated cache. Additionally or alternatively, the push engine could specify a maximum level of cache to which the data is to be pushed, such as a level of cache lower than a cache directory, for example, if a system implements a directory based coherency protocol. Alternatively, the push engine could instruct the source of the data to push the data to a shared memory structure. The shared memory structure could be implemented as a memory structure that is accessible to the next consumer (e.g., a shared cache). The process proceeds to 740.

At 740, the source of the data pushes the data to the memory location associated with the next consumer. In one example, the source of the data could determine the particular cache level of proximity to which the data is to be pushed. The determination of the level of proximity could vary based on the size of the data. The process proceeds to 750.

At 750, the next consumer of the data executes the examined instruction. Typically, when executing the examined instruction, the next consumer can look to a local memory (e.g., a local cache) for the data associated with the examined instruction. In the present process, since the data has been pushed to a local memory of the next consumer, the next consumer can find the data in the local memory and can executed the examined instruction without needing to request the data from another source. This is as if the source core caused the data to be prefetched on behalf of the consumer, such as may correspond to a separate core or I/O. This approach is particularly useful in concurrency control applications, such as locking of data structures or message passing.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A system for pushing data, the system comprising:
at least one processor;
consumers of data;
an instruction queue to store computer-executable instructions waiting to be executed, wherein the instructions are instructions of the consumers during operation of the consumers in the system, the instructions being different from requests for data;
a source node to store a coherent copy of a block of data; and
a push engine executable on the at least one processor and configured to determine, based on accessing the instruction queue during operation of the consumers, a next consumer of the block of data from among the consumers, the determination being made in the absence of the push engine detecting a request for the block of data from the next consumer, the push engine configured to cause the source node to push the block of data to a memory associated with the next consumer to reduce latency of the next consumer accessing the block of data, wherein the push engine is configured to base the determination of the next consumer on an identifier associated with a particular one of the instructions waiting to be executed in the instruction queue.

2. The system of claim 1, the next consumer being associated with a cache, wherein the push engine is configured to cause the block of data to be pushed from a cache associated with the source node to the cache associated with the next consumer, wherein the memory comprises the cache associated with the next consumer.

3. The system of claim 2, wherein the cache associated with the next consumer comprises a plurality of different cache levels, and wherein the push engine is configured to provide an indicator to the source node that indicates to which of the plurality of different cache levels associated with the next consumer the block of data is to be pushed.

4. The system of claim 3, wherein the push engine comprises instructions to determine to which of the plurality of different cache levels associated with the next consumer the block of data is to be pushed.

5. The system of claim 3, wherein the push engine comprises instructions to determine a maximum level of the plurality of different cache levels associated with the next consumer to which the block of data is to be pushed, wherein the maximum level specifies that the block of data is to be pushed to the maximum level or any of the cache levels in closer proximity to the next consumer than the maximum level.

6. The system of claim 2, wherein the source node is configured to transfer ownership of the block of data to the cache associated with the next consumer in conjunction with the block of data being pushed.

7. The system of claim 1, wherein the source node is associated with a cache, and the next consumer comprises an external input/output device having the memory, the push engine configured to cause a copy of the block of data to be pushed by the source node from the cache associated with the source node to the memory of the input/output device.

8. The system of claim 1, wherein the next consumer is configured to execute at least one instruction that employs the block of data after the block of data has been pushed from the source node to the memory associated with the next consumer.

9. The system of claim 1, wherein the source node is configured to employ a concurrency control mechanism to prevent access to the block of data temporarily, the push engine being invoked by the concurrency control mechanism to cause the block of data to be pushed to the next consumer in response to an unlock operation of the concurrency control mechanism being performed on the block of data.

10. The system of claim 1, wherein the particular instruction includes an argument containing the identifier of a processor, wherein the identified processor is the next consumer.

11. The system of claim 1, wherein the push engine is configured to determine the next consumer during runtime of the system in which the consumers are actively operating.

12. The system of claim 1, wherein the computer-executable instructions are opcodes.

13. A method for pushing data, the method comprising:
providing an instruction queue storing computer-executable instructions of consumers of data, wherein the instructions are issued during operation of the consumers in a system, and wherein the instructions are different from requests for data;
determining, by at least one processor based on accessing the instructions in the instruction queue during operation of the consumers, a next consumer of a block of data from among the consumers in the absence of detecting a request for the block of data from the next consumer; and pushing a coherent copy of the block of data from a source node to at least one memory associated with the next consumer to reduce latency of the next consumer accessing the block of data.

14. The method of claim 13, wherein the pushing further comprises sending a copy of the block of data from a cache associated with the source node to a cache associated with the next consumer, the at least one memory comprising the cache associated with the next consumer.

15. The method of claim 14, wherein the pushing further comprises transferring ownership of the block of data from the source node to the next consumer.

16. The method of claim 15, wherein the pushing of the coherent copy of the block of data is performed in response to an unlock operation of a concurrency control mechanism that temporarily locked access to the block of data.

17. The method of claim 13, wherein the pushing of the block of data further comprises pushing at least one of the block of data or status information from an input/output operation to a cache memory associated with the next consumer.

18. The method of claim 13, wherein the computer-executable instructions are opcodes.

19. A system for pushing data, the system comprising:
at least one processor;
consumers of data;
a data structure to store code associated with the consumers during operation of the consumers in the system;
a source node to store a coherent copy of a block of data;
a push engine executable on the at least one processor and configured to determine, based on accessing the data structure during operation of the consumers, a next consumer of the block of data from among the consumers, the determination being made in the absence of the push engine detecting a request for the block of data from the next consumer, the push engine configured to cause the source node to push the block of data to a memory associated with the next consumer to reduce latency of the next consumer accessing the block of data, wherein the data structure is a process table to store a plurality of processes that are executing in the system, wherein the push engine is configured to base the determination of the next consumer on examination of the process table, and wherein the push engine is configured to query the process table with an identification of the block of data; and,
a component associated with the process table configured to:
in response to the query, parse the process table to find an instruction of one of the processes that employs the block of data, and
provide an identity of the next consumer based on finding the instruction that employs the block of data.

20. A system comprising:
consumers of data;
an instruction queue to store computer-executable instructions of the consumers issued during operation of the consumers in the system, wherein the instructions are different from requests for data;
at least one processor; and
a push engine executable on the at least one processor to:
determine, based on accessing the instruction queue during operation of the consumers, a next consumer of a block of data stored in a source node, in the absence of detecting a request for the block of data from the next consumer, wherein the next consumer is one of the consumers; and cause the block of data to be pushed from the source node to a memory associated with the next consumer to reduce latency associated with the next consumer accessing the block of data.

21. The system of claim 20, further comprising a concurrency control mechanism to temporarily prevent access to the block of data by placing a lock, wherein the push engine is configured to cause pushing of the block of data to the memory associated with the next consumer based on execution of an instruction that specifies an unlock operation on the block of data.

22. The system of claim 20, wherein the instruction queue is to store identifiers of consumers corresponding to the instructions.

23. The system of claim 20, wherein the push engine is configured to determine the next consumer during runtime of the system in which the consumers are actively operating.

24. The system of claim 20, wherein the instructions of the instruction queue are non-forwarding instructions that are waiting for execution, wherein the non-forwarding instructions are instructions that do not specify pushing of data.

25. The system of claim 20, wherein the computer-executable instructions are opcodes.

26. A method for pushing data, the method comprising:
providing a data structure storing code associated with consumers of data during operation of the consumers in a system, wherein the data structure comprises an operating system process table that stores processes that are executing in the system;
determining, by at least one processor based on accessing the operating system process table during operation of the consumers, a next consumer of a block of data from among the consumers in the absence of detecting a request for the block of data from the next consumer;
pushing a coherent copy of the block of data from a source node to at least one memory associated with the next consumer to reduce latency of the next consumer accessing the block of data;
querying the process table with an identification of the block of data;
in response to the querying, parsing the process table to find an instruction of one of the processes that employs the block of data; and
provide an identity of the next consumer based on finding the instruction that employs the block of data.

* * * * *

UNITED STATES PATENT AND TRADEMARK OFFICE
CERTIFICATE OF CORRECTION

PATENT NO. : 8,051,250 B2  
APPLICATION NO. : 11/686132  
DATED : November 1, 2011  
INVENTOR(S) : Blaine D Gaither et al.

It is certified that error appears in the above-identified patent and that said Letters Patent is hereby corrected as shown below:

In column 3, line 13, delete "provided" and insert -- provide --, therefor.

In column 12, line 46, in Claim 19, delete "and," and insert -- and --, therefor.

Signed and Sealed this
Twenty-sixth Day of June, 2012

David J. Kappos
*Director of the United States Patent and Trademark Office*